(12) United States Patent
Andrieu et al.

(10) Patent No.: US 7,771,096 B2
(45) Date of Patent: Aug. 10, 2010

(54) ILLUMINATION DEVICE FOR A CIGAR LIGHTER OR MULTIFUNCTION ELECTRIC SOCKET

(75) Inventors: Michel Andrieu, Bout du Pont de l'Arn (FR); Jean-Louis Bonnet, Saint Amans Val Thoret (FR); Francis Lau, Labruguiere (FR); Jérôme Monnot, Bout du Pont de l'Arn (FR)

(73) Assignee: Valeo Vision, Bobigny (FR)

( * ) Notice: Subject to any disclaimer, the term of this patent is extended or adjusted under 35 U.S.C. 154(b) by 426 days.

(21) Appl. No.: 11/693,194

(22) Filed: Mar. 29, 2007

(65) Prior Publication Data

US 2007/0230163 A1 Oct. 4, 2007

(30) Foreign Application Priority Data

Mar. 31, 2006 (FR) .................................. 06 02843

(51) Int. Cl.
 *B60Q 1/00* (2006.01)
(52) U.S. Cl. .................... 362/488; 362/652; 362/646
(58) Field of Classification Search ................. 362/28, 362/29, 30, 555, 565, 540, 488–492, 84, 362/640, 646, 652, 655, 657, 104, 253
See application file for complete search history.

(56) References Cited

U.S. PATENT DOCUMENTS

| | | | |
|---|---|---|---|
| 4,079,242 A * | 3/1978 | Seibel | ......................... 362/577 |
| 5,030,811 A | 7/1991 | von Gaisberg et al. | |
| 5,039,832 A | 8/1991 | Polacek et al. | |
| 5,928,539 A | 7/1999 | Thivet | |
| 6,350,039 B1 | 2/2002 | Lee | |
| 6,874,921 B2 * | 4/2005 | Verlage et al. | ............... 362/487 |
| 7,063,447 B2 | 6/2006 | Andrieu et al. | |
| 7,461,959 B2 * | 12/2008 | Baldauf et al. | ............... 362/487 |
| 2005/0099800 A1 | 5/2005 | Andrieu et al. | |

FOREIGN PATENT DOCUMENTS

| | | |
|---|---|---|
| EP | 0406845 A2 | 1/1991 |
| EP | 0678419 A2 | 10/1995 |
| EP | 0819575 A2 | 1/1998 |
| EP | 1516777 A1 | 3/2005 |
| EP | 1727170 A | 11/2006 |
| EP | 1737008 A | 12/2006 |
| FR | 2595132 | 9/1987 |
| FR | 2758111 | 7/1998 |

* cited by examiner

*Primary Examiner*—Sandra L O'Shea
*Assistant Examiner*—Danielle Allen
(74) *Attorney, Agent, or Firm*—Jacox, Meckstroth & Jenkins

(57) ABSTRACT

An illumination device for a cigar lighter or for a multifunction socket, comprising a single-piece component made from material at least partially transmitting light, the component comprising an illuminating ring and a housing for a printed circuit provided with at least one light-emitting diode and electrical connection means.

22 Claims, 3 Drawing Sheets

ILLUMINATION DEVICE FOR A CIGAR LIGHTER OR MULTIFUNCTION ELECTRIC SOCKET

BACKGROUND OF THE INVENTION

1. Field of the Invention

The present invention concerns electric cigar lighters, or multifunction electric sockets, in particular intended to equip motor vehicles. It relates more particularly to means for illuminating the cigar lighters or multifunction sockets, being in particular in the form of illuminating rings associated with an illuminating module.

2. Description of the Related Art

As is known, cigar lighters are illuminated by a lamp mounted in an illuminating module. The electrical supply to this lamp is made by means of blades of conductive material. These blades are on the one hand in electrical contact with the body of the cigar lighter forming an earth. They are on the other hand either in contact with a tongue of the connector or directly connected to the electrical supply cable. An example of an illuminating module carried by an illuminating ring of a cigar lighter is described in the patent FR 2 758 111, which is equivalent to U.S. Pat. No. 5,928,539.

It is sought to improve the reliability and longevity of lamps. This is the reason why it was proposed in the patent application EP 0 819 575 to replace the conventional lamp with a light emitting diode, generally designated by the English abbreviation "LED". Diodes have in fact generally a longer service life than conventional lamps, and a lower electrical consumption. However, the arrangement of the diode in the cigar lighter according to this document does not entirely give satisfaction: it does not make it possible to illuminate the ashtray, and leaks of light are to be feared through reflection on the metal body of the cigar lighter. Also it does not appear to afford a great deal of flexibility in its electrical supply method. Its mounting is not very compact. It also makes it necessary to use a manual soldering method for the wires connecting to the friction contacts and to place the diode, as well as the resistor and the friction contacts, on a slide before soldering them together to produce the electrical circuit.

A first improvement to LED illumination modules was proposed in the patent EP 1 516 777: it is a case of an illuminating ring on which an illuminating module is mounted, the illuminating module comprising a printed circuit provided with at least one light emitting diode, a cover intended to at least partly house the printed circuit, and at least two electrical supply tongues for the said printed circuit, mechanically fixed to the cover.

However, it is still possible to further improve the design of these illuminating modules, in particular on an optical level, so that the light flux emitted by the light emitting diode is better used, and on an electrical and mechanical level so that it is simpler to assemble the illuminating module and to make its electrical connections.

SUMMARY OF THE INVENTION

The aim of one embodiment of the invention is then to further improve the design of the illuminating modules for a cigar lighter or multifunction socket. The embodiment seeks in particular to develop illuminating modules using light emitting diodes and which are reliable and have a long service life but which are also for example more compact and/or easier to assemble in an automated manner and/or more reliable with regard to their electrical connection, and/or more effective in terms of illumination obtained.

An object of the invention is first of all an illumination device for a cigar lighter or multifunction socket comprising a single-piece component made from material at least partially transmitting light, the component comprising an illuminating ring and a housing for a printed circuit provided with at least one light emitting diode and electrical connection means.

Within the meaning of the invention, printed circuit means the printed circuit or circuits deposited on its substrate and provided with all the conductive tracks and all the appropriate electronic components. This printed circuit can also be provided with one or more resistors, capacitors or diodes.

The invention applies equally well to cigar lighters and multifunction sockets: a multifunction socket, in particular for a motor vehicle, comprises a hollow body serving as a power socket (which can be compared to the ignition body of a cigar lighter), which comprises electrical connection means and which is intended to cooperate with a removable accessory socket (the ignition body of the cigar lighter for its part cooperating with a removable functional heating plug).

As already mentioned, using diodes is advantageous since this type of light source is reliable, has a long service life and is economical in terms of electrical consumption.

The invention therefore has recourse to a single part, referred to a single-piece component, both for holding the printed circuit and for serving as an illuminating ring. It no longer uses a distinct cover as described in the patent EP 1 516 777, which is industrially highly advantageous: it is possible to mold this element in a single piece, which simplifies and shortens the manufacture of the illuminating module.

The single-piece component is preferably made from a transparent material based on polymer, in particular based on polycarbonate, which can easily be moulded by injection, and which has the required properties in terms of thermal resistance and mechanical strength.

The single-piece component can be tinted in different colors.

Advantageously, it comprises an intermediate part between the illuminating ring and the housing for the printed circuit, the intermediate part serving as a light guide for conducting the light emitted by the light emitting diode to the illuminating ring. This "integrated light guide" can in fact be in the form of an extension of the illuminating ring, towards the light source, the light emitting diode, which is adapted to best channel this light to the ring. In concrete terms, by forcing the light emitted by the light emitting diode to progress through this light guide towards the ring, by total reflection of the light rays in this guide, the quantity of light reaching the ring is very significantly increased and in this way cigar lighters are obtained that are appreciably more illuminated. Previously, in particular according to the design described in the aforementioned patent EP 1 516 777, the light progressed from the light emitting diode towards the ring by diffusion of the light in the ring and by reflection on the ignition body surrounding the ring, which, on an optical level, assisted leaks of light.

Still for limiting further the leaks of light, it is possible to blacken/make reflective all or part of one of the faces at least of the printed circuit.

Preferably, the intermediate part of the single-piece component has a curved profile, with at least one change-of-direction point, in particular two. Alternatively, it may have a profile having at least two faces inclined with respect to each other. In both cases, it is a question of best adapting the shape of this integral light guide to allow the total reflection of the light rays propagating therein, the light being defined by a profile delimited by two walls.

Still for the purpose of limiting leaks of light, the intermediate part of the single-piece component has an entry face intended to best collect the light emitted by the emitting surface of the light-emitting diode. This face serves as a collimator for the light that it receives, and its adapted shape can have a toric or cylindrical surface. Any concave surface best "enveloping" the light cone emitted by the light-emitting diode, the collimator is possible.

More generally, the intermediate part of the single-piece component has roughly an at least partially annular shape, with a shape that is preferably splayed towards the illuminating ring. Compared with a normal illuminating module, the ring has therefore been extended and splayed in the direction of the bottom of the ignition body, in the direction of the light-emitting diode. This intermediate part not only fulfils the role of light guide but also provides the mechanical connection between the ring and the housing of the printed circuit. It can extend the ring only over part of its circumference, in order to provide the mechanical and optical connection with the housing of the printed circuit with light emitting diode which for its part can be compared to a leg, to an appendage with a preferably elongate shape along an axis parallel to the central axis of the ring (which is also the axis of the ignition body of the cigar lighter).

Optionally, the intermediate part of the single-piece component has a means for preventing the formation of a hot spot of light in the illuminating ring vertically in line with its entry face for the light. This is because it has been noted that the ring tended to more strongly illuminate the area vertically in line with the entry face of the light guide, and therefore just "above" the point of injection of the light into the single-piece component (the area of the "hot spot"). In order to protect against this, if it is required to have a ring illuminating very evenly, means is provided so that the path of the light rays involved are intentionally disturbed.

This can be achieved by means of a prism forming an integral part of the single-piece component and disposed on the direct path of the light between the entry face for the light and the area of the illuminating ring vertically in line with the entry face. The rays reaching the prism are then returned in many directions in a controlled fashion.

This can be achieved in an even more simple fashion, by carefully disposing a means of fixing the single-piece component to the rest of the cigar lighter, of the rib or tongue type, which forms an integral part of the single-piece component and which is disposed on the direct path of the light between the entry face and the area of the ring vertically in line with the entry face: the aim is the same, the rays reaching the tongue or rib being returned in various directions instead of all continuing their direct path towards the ring.

Optionally, the intermediate part can comprise at least one dedicated area that guides part of the light emitted by the diode and propagating in the said intermediate part to an exit face, in particular to illuminate an accessory close to the ring: through the locally adapted shape of the intermediate part, part of the light emitted by the diode is thus diverted in order to make it emerge locally, so that it creates a spot of light, which can be used, for example, to illuminate an ashtray in the case of a cigar lighter.

Advantageously, the device described above is associated with a printed circuit inserted at least partly in the housing provided in the single-piece component, the printed circuit being provided with a diode, and two electrical connection tongues, in particular fixed by soldering to the circuit.

These soldered tongues are highly advantageous to use: they may have a geometric shape that is very simple to produce, and in addition this strong mechanical fixing, by soldering, is very reliable, the mechanical and therefore electrical contact being more secure than when connection tongues bearing on the conductive surfaces of the circuit by spring effect are used.

The circuit is in particular of the CMOS type, that is to say non-traversing, also referred to as a surface printed circuit.

The diode is preferably chosen so as to be of the "side emitter" type, that is to say with lateral emission: it is thus possible to have a printed circuit that is substantially disposed in a plane parallel to the axis of the ring and to that of the ignition body, and a light-emitting diode that emits laterally, also in a principal direction parallel to the central axis of the ring: this configuration facilitates the design of the point of injection of the light into the single-piece component, namely the entry face previously described, and the light rays thus enter the component with already a direction roughly directed towards the ring.

The printed circuit can also be provided with a second light diode, in particular of the reverse emission type (known by the English term "reverse gullwing" diode): this second diode can be dedicated so as to create a spot of light able to illuminate an adjoining accessory, such as an ashtray. In this way a single printed circuit is kept.

An equivalent solution, less economical and more bulky, consists of using two adjoining printed circuits, the first provided with the diode intended to supply the illuminating ring with light, the second provided with another diode for illuminating an accessory of the ashtray type or the like.

The printed circuit is for example inserted in the housing of the single-piece component by using guidance means provided in the housing, in particular of the runner type. It is thus possible to provide two parallel runners in the housing cooperating with the two opposite edges of the printed circuit.

It is preferable for the printed circuit to be locked mechanically in the housing of the single-piece component, in particular by means of lugs projecting from it and providing stops preventing it from emerging from the runner or runners, and complementary cavities present in the cover, of the snapping-in system type. A slight deformation of the circuit advantageously enables it to project beyond these stops on mounting.

The invention also concerns the equipped printed circuit alone, before mounting in the single-piece component. It also concerns the cigar lighter in its entirety, comprising the device described above, with an ignition body inserted in the single-piece component. It also concerns the multifunction socket as a whole, comprising a hollow body serving as a socket inserted in the single-piece component. It also concerns the vehicle comprising such a cigar lighter or such a multifunction socket.

These and other objects and advantages of the invention will be apparent from the following description, the accompanying drawings and the appended claims.

BRIEF DESCRIPTION OF THE DRAWINGS

The invention will be detailed below with non-limiting examples, with the help of the following figures.

The figures are given only by way of indication, are highly schematic in order to guarantee clarity thereof, and are not necessarily to scale.

DESCRIPTION OF THE PREFERRED EMBODIMENTS

Figure 1:
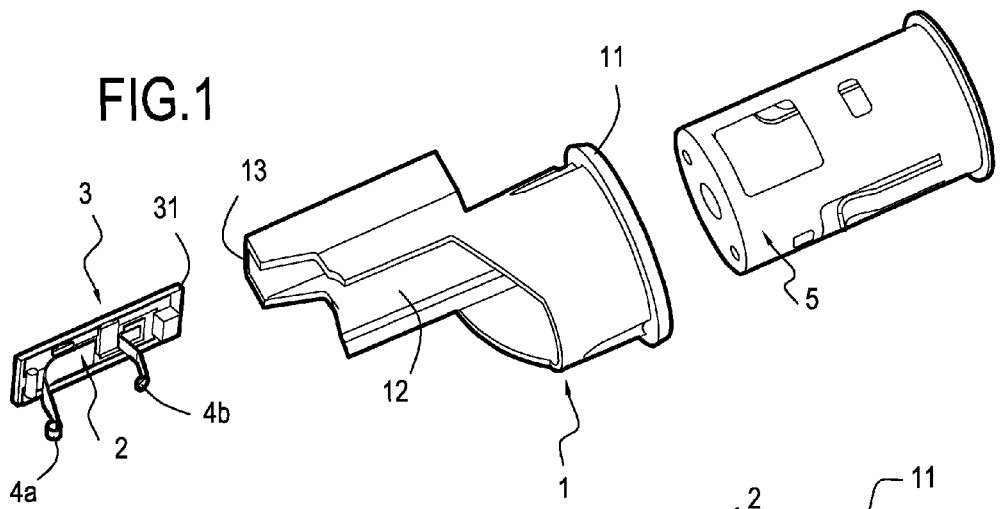
FIG. 1. is an exploded perspective view showing components of a cigar lighter with an illuminated ring, including the single-piece component and the printed circuit according to the invention.
Figure 2:
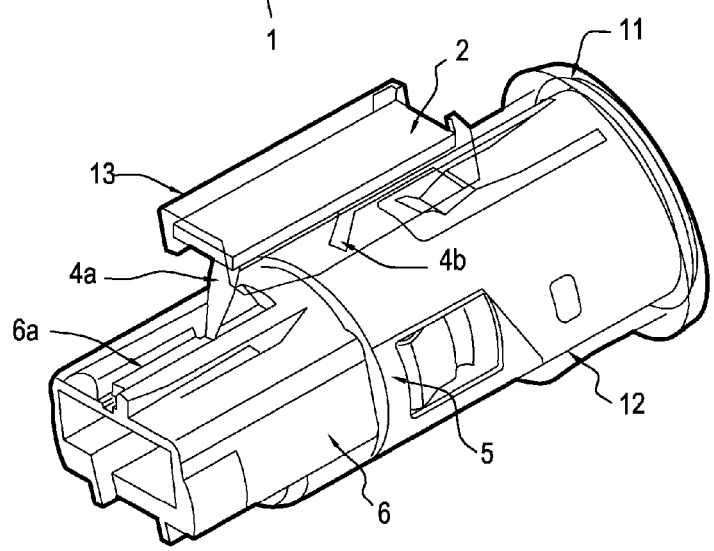
FIG. 2 is a view of the components according to FIG. 1, after assembly.

FIGS. 1 and 2 depict some of the components of a cigar lighter with an illuminating ring. A detailed description of a complete cigar lighter can be found in the patent FR 2 758 111, which is equivalent to U.S. Pat. No. 5,928,539. The following description will concentrate on the characteristics more specific to the illuminating module according to one embodiment of the invention.

This cigar lighter comprises an ignition body 5 for receiving and heating a removable heated plug, not shown. It also comprises a single-piece component 1, entirely molded from a block of translucent polycarbonate, in which the ignition body 5 is inserted on assembly. A connector 6 is fixed to the ignition body 5.

The component 1 comprises in fact three parts:
an illuminating ring 11 intended to surround the ignition body 5 in order to locate the cigar lighter at night,
a housing 13 intended to accept the printed circuit 3 of the CMOS type, to which a light-emitting diode 2 and two electrical connection tongues 4a, 4b are soldered,
an intermediate part 12 mechanically connecting the ring 11 to the elongate-shaped housing 13. This intermediate part 12 will also serve as a light guide and has, like the ring, a roughly annular shape. It can be seen from FIGS. 1, 2, 3 and 4 that this part 12 is asymmetric: it "extends" the ring in an annular fashion only towards the housing 13, with an adjustable "connection" profile. There is thus a single-piece component 1 in the form, roughly, of a ring connected locally to a post formed by the housing 13 of the printed circuit 3.

The ring 11 and/or the intermediate part 12 are provided with mechanical means of the lug, stop and cavity type intended to cooperate with means of complementary shape in order to fix the component to the ignition body.

The electrical connection of the printed circuit 3 to the connector 6 is made in the following fashion: one of the connection tongues 4a soldered to the printed circuit 3 is, in the mounting position of the assembly, in contact with the ignition body 5 corresponding to the zero volts of the vehicle. Moreover, the other tongue 4b soldered to the printed circuit is in contact with the lug of the three-point connector at a voltage of 12 volts.

Figure 3:
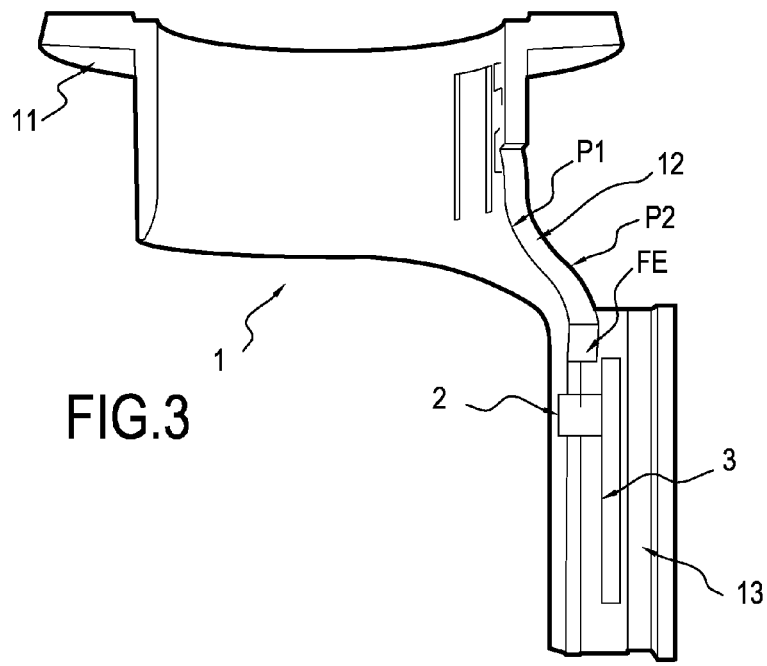
FIG. 3 is a view in section of the single-piece component and of the printed circuit of the cigar lighter according to the invention.
Figures 4A, 4B:
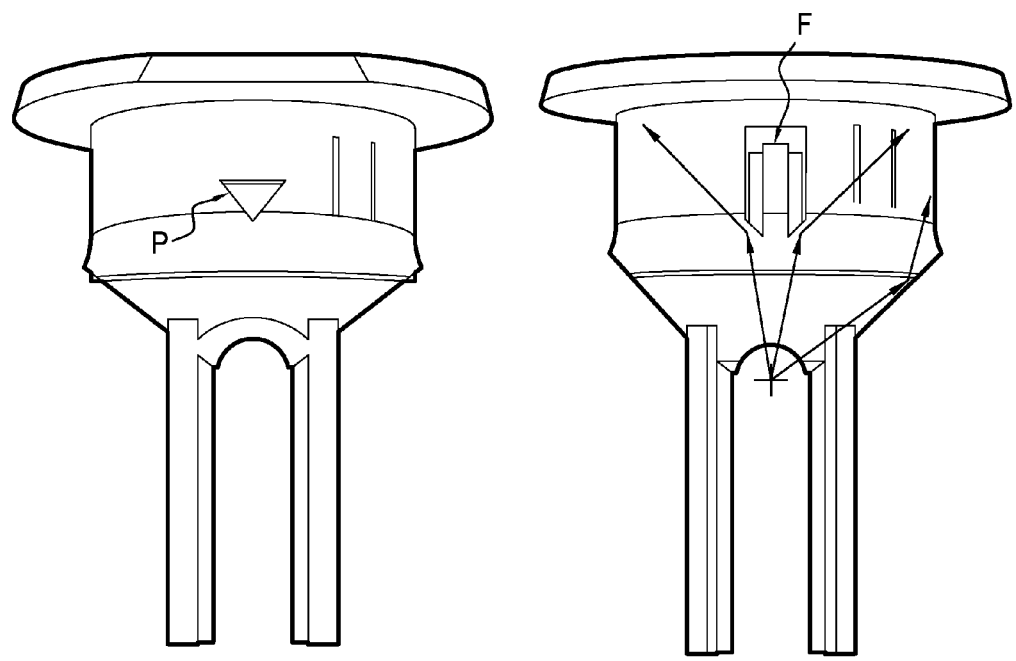
FIGS. 4A and 4B illustrate a front view of the single-piece component according to two variants of the invention.

FIGS. 3, 4A and 4B illustrate the functioning of the single-piece component 1 on the optical level:

FIG. 33 shows a section of the component 1 through the center of the part 12 serving as a light guide. This part 12 has a splayed profile connecting the parts 11 and 13. This profile has two change-of-direction points P1 and P2. At the bottom part (in the representation of the figure), this profile ends in a surface referred to as the entry face FE that constitutes the point of injection of the light from the diode 2 fixed to the printed circuit 3. The diode 2 is of the "side emitter" type, the English term designating diodes whose emitting surface is disposed laterally and in fact perpendicular to the plane of the diode support: it sends the light in a favored direction parallel to the plane of the printed circuit by means of a lateral emitting surface.

(Use can alternatively be made of a conventional light-emitting diode that emits perpendicular to the printed circuit, in this case the shape of the intermediate part is to be adapted.)

This light reaches the entry face FE, which has a toric shape facilitating the maximum recovery of the light flux. The light then propagates from the "bottom" part to the "top" part of the guide 12 by total reflection of the rays from one wall of the guide to the other. (The terms "bottom", "top" "vertically" etc do not refer to the positioning of the device once mounted in the vehicle dashboard, it is an explanatory convenience according to the arbitrary representation of the components in the figures.)

Without other precaution, the illuminating ring 11, in its area vertically in line with the entry face, may illuminate more strongly than in the rest of its circumference. Two means can avoid the formation of a "hot spot" on the ring:
according to FIG. 4A, the profile of the guide 12 is modified locally in order to add a prism P, so as to "explode" the rays that strike to the two oblique sides, to force them to spread in different directions rather than directly vertically towards the ring 11;
according to FIG. 4B, not a prism but a fixing tongue F is interposed, which, apart from its mechanical role of fixing the single-piece component 1 to the ignition body, will also redirect the rays in a more or less random fashion, and, like the prism, reduce the quantity of light radiation reaching the ring by propagating essentially vertically rather than laterally.

Prism P and tongue F can also be attached to the component 1.

FIG. 4B depicts the routing of two arbitrary rays which, striking the bottom edges of the tongue F, spread in opposite oblique directions. By way of illustration, the routing of a third light ray starting from the entry face FE in a much more oblique fashion is also depicted in this figure. It will be understood that the multiplicity of rays starting from the entry face enable, by a succession of total reflections, the light from the light-emitting diode to reach the entire circumference of the ring.

The ring, with this light propagation system, illuminates appreciably more. In order to give an order of magnitude, it illuminates at least twice as much as with the illuminating module described in the aforementioned patent EP 1 516 777, for a light-emitting diode emitting the same light flux.

Figure 5:
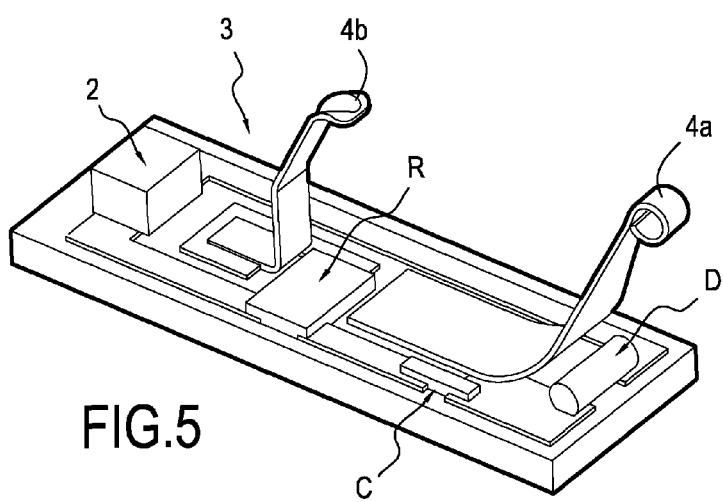
FIG. 5 is a perspective view of the printed circuit provided with the light-emitting diode and its power supply tongues.

FIG. 5 details the printed circuit 3 and its main components. It is fixed to the housing 13 of the single-piece component by a system of runners present in the housing and in which it is possible to insert the circuit by two of its opposite edges. Locking in position is provided by a snapping-in system using a recess 31 disposed on the flank of the printed circuit 3 as shown in FIG. 1.

The circuit 3 is provided with the light-emitting diode 2, a connection lug 4A intended to be connected to the connector 6 (− terminal), another lug 4B electrically connected to the ignition body 5 (+ terminal), the bulbous end of which promotes good electrical contact with the ignition body 5. The circuit 3 also comprises in particular a resistor R for providing the necessary voltage drop from the 12 V (or 24 V) of the vehicle to the appropriate voltage for supplying the diode 2 (in particular approximately 2.2 V or 3 V according to the type of diode), a protection diode D to prevent any short-circuit in the case of reversal of polarity (which is optional), a capacitor C for protecting against start-up overvoltages (which is optional, and which is generally omitted when the vehicle is provided with an electrical supply protected from overvoltages). The circuit 3 comprises all the useful conductive tracks known to persons skilled in the art.

Figure 6:
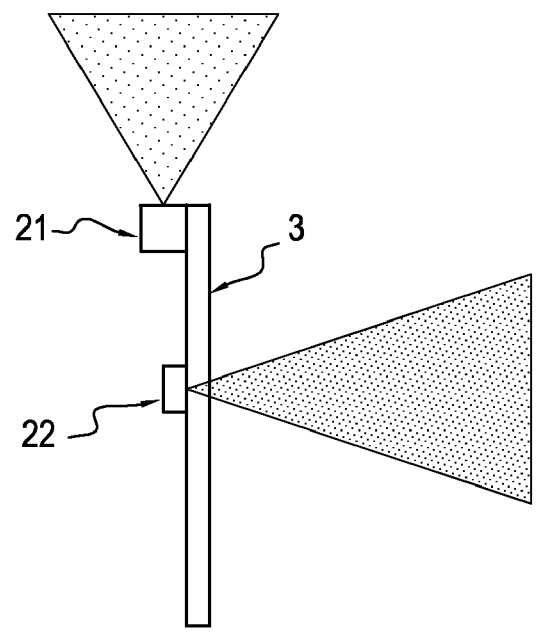
FIG. 6 is a view in section of a variant of the printed circuit according to the invention.

FIG. 6 depicts a variant design of the printed circuit of the invention: the circuit comprises not only the lateral emission diode 21, but also another rear emission diode 22 ("reverse gullwing" in English), which therefore emits in a half-space on the same side as the face of the printed circuit opposite to the face on which it is disposed: the light emitted by this diode 22 serves to illuminate any element disposed in the vicinity of the dashboard, such as an ashtray. The housing 13 of the single-piece component is possibly to be adapted in an appropriate fashion to allow the light from the diode 22 to pass.

Figure 7:
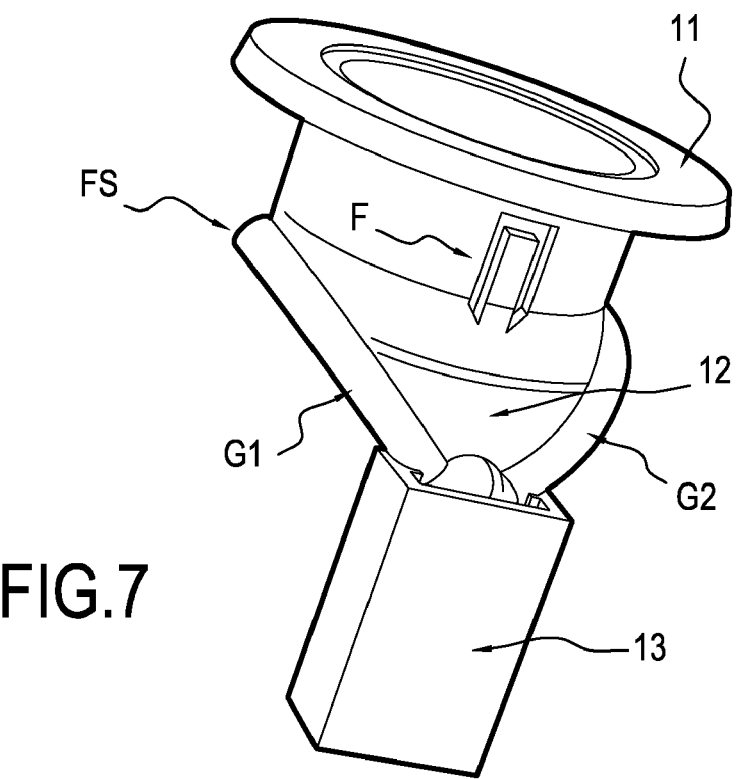
FIG. 7 is a perspective view of the single-piece component according to a variant.

FIG. 7 depicts a variant of the single-piece component 1: the intermediate part comprises two lateral bulges G1, G2 designed so as to pick up part of the light from the diode entering through the face FE and to direct this light towards exit faces FS, the ends of which they constitute: these areas G1, G2 are therefore small light guides in the light guide 12 and make it possible to create, emerging through the faces FS, light spots in order to illuminate adjacent accessories, whilst continuing to use printed circuits with a single diode like the one in FIG. 5.

The above examples of an illuminating module can apply equally well to cigar lighters and to multifunction sockets: if the figures are repeated, it suffices to substitute for the ignition body 5 a multifunction socket body of similar size.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A lighting device in combination with a cigar lighter or a multifunction socket, said lighting device comprising a single-piece component that receives said cigar lighter or multifunction socket and that is made from material at least partially transmitting light, said single-piece component comprising an illuminating ring and a housing for receiving a printed circuit provided with at least one light-emitting diode and electrical connection means for connecting the printed circuit to the cigar lighter or the multifunction socket, said housing further comprising an intermediate light guide integral with said illuminating ring, said intermediate light guide having an entry face for receiving light from said at least one light-emitting diode, said at least one light-emitting diode becoming positioned in operative relationship with said entry face after said printed circuit is received in said housing, wherein said illuminating ring, said intermediate light guide and said housing are an integral one-piece molded construction so that light from said at least one light-emitting diode is received in said entry face and travels through said intermediate light guide of said housing and through said illuminating ring.

2. The lighting device according to claim 1, wherein said single-piece component is made from a transparent material based on polymer, in particular comprises polycarbonate.

3. The lighting device according to claim 1, wherein said intermediate light guide is between said illuminating ring and said housing for the printed circuit, said intermediate light guide being curved and serving as a light guide for conducting the light emitted by said at least one light-emitting diode to said illuminating ring.

4. The lighting device according to claim 3, wherein said intermediate light guide has said curved profile, with at least one change-of-direction point.

5. The lighting device according to claim 3, wherein said intermediate light guide comprises at least one dedicated area that guides part of the light emitted by said at least one light-emitting diode and propagating it in said intermediate light guide towards an exit face in order to illuminate an accessory close to said illuminating ring.

6. The lighting device according to claim 3, wherein said intermediate light guide has a profile having at least two surfaces inclined with respect to each other.

7. The lighting device according to claim 3, wherein said intermediate light guide of said single-piece component has an entry face intended to collect the light emitted by said emitting surface of said at least one light-emitting diode.

8. The lighting device according to claim 3, wherein the entry face of said intermediate light guide of the single-piece component has a toric or cylindrical surface.

9. The lighting device according to claim 3, wherein said intermediate light guide of said single-piece component is roughly annular in shape, with a shape preferably splayed towards said illuminating ring.

10. The lighting device according to claim 3, wherein said intermediate light guide of said single-piece component has means for preventing the formation of a hot spot of light in said illuminating ring vertically in line with its entry face for the light.

11. The lighting device according to claim 10, wherein the means for preventing the formation of a hot spot comprises:
a prism forming an integral part of said single-piece component and disposed on a direct path of the light between the entry face for the light and the area of said illuminating ring vertically in line with said entry face, and
a means of fixing said single-piece component to a cigar lighter, of the rib or tongue type, forming an integral part of said single-piece component and also being disposed on the direct path of the light between said entry face and the area of said illuminating ring vertically in line with said entry face.

12. The lighting device according to claim 1, which is associated with a printed circuit at least partly inserted in said housing provided in said single-piece component, said printed circuit being provided with a diode and two electrical connection tongues, in particular fixed by soldering to said circuit.

13. The lighting device according to claim 12, wherein said printed circuit is provided with a diode of the lateral emission type.

14. The lighting device according to claim 12, wherein said printed circuit is provided with a diode of the rear emission type.

15. The lighting device according to claim 11, wherein said printed circuit is inserted in said housing of the single-piece component using a guidance means provided in the housing.

16. The lighting device according to claim 1, wherein said printed circuit is mechanically locked in said housing of said single-piece component by means of a system of complementary lugs and cavities for fixing by clipping.

17. The lighting device according to claim 1, and further comprising a cigar lighter comprising an ignition body, or respectively a socket body, inserted in said single-piece component.

18. A lighting device comprising:
a power outlet;
a component that receives said power outlet made from material at least partially transmitting light;

an illuminating ring;

a housing for receiving a printed circuit comprising at least one light-emitting diode; and at least one electrical connector for connecting said printed circuit to a power source;

said housing further comprising an intermediate light guide integral with said illuminating ring, said intermediate light guide having an entry face for receiving light from said at least one light-emitting diode, said at least one light-emitting diode becoming positioned in operative relationship with said entry face after said printed circuit is received in said housing, wherein said illuminating ring, said intermediate light guide and said housing are an integral one-piece molded construction so that light from said at least one light-emitting diode is received in said entry face and travels through said intermediate light guide of said housing and through said illuminating ring.

19. The lighting device according to claim 18, wherein said component is a one-piece molded construction made from a transparent material based on polymer, in particular comprises polycarbonate.

20. The lighting device according to claim 19, wherein said transparent material is a polymer, in particular comprises polycarbonate.

21. The lighting device according to claim 18, wherein said component comprises an intermediate light guide between said illuminating ring and said housing for the printed circuit, said intermediate light guide serving as a light guide for conducting the light emitted by said at least one light-emitting diode to said illuminating ring.

22. The lighting device according to claim 21, wherein the intermediate light guide has a curved profile, with at least one change-of-direction point.

\* \* \* \* \*